(12) United States Patent
Rehwald et al.

(10) Patent No.: US 11,408,385 B2
(45) Date of Patent: Aug. 9, 2022

(54) COMPONENT, IN PARTICULAR FUEL LINE OR FUEL DISTRIBUTOR, AND FUEL INJECTION SYSTEM

(71) Applicant: Robert Bosch GmbH, Stuttgart (DE)

(72) Inventors: Andreas Rehwald, Bietigheim-Bissingen (DE); Ralf Weber, Bretten (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/282,739

(22) PCT Filed: Oct. 7, 2019

(86) PCT No.: PCT/EP2019/077004
§ 371 (c)(1),
(2) Date: Apr. 2, 2021

(87) PCT Pub. No.: WO2020/114650
PCT Pub. Date: Jun. 11, 2020

(65) Prior Publication Data
US 2022/0003195 A1 Jan. 6, 2022

(30) Foreign Application Priority Data
Dec. 7, 2018 (DE) .......................... 102018221198.1

(51) Int. Cl.
*F02M 55/04* (2006.01)
*F02M 55/02* (2006.01)
(Continued)

(52) U.S. Cl.
CPC ...... *F02M 55/025* (2013.01); *F02M 25/0228* (2013.01); *F02M 43/04* (2013.01);
(Continued)

(58) Field of Classification Search
CPC ...... F02M 55/025; F02M 55/02; F02M 55/04; F02M 25/0228; F02M 25/0221;
(Continued)

(56) References Cited

U.S. PATENT DOCUMENTS 3,020,928 A * 2/1962 Peet .......................... F15B 1/16
138/30
6,418,909 B2 * 7/2002 Rossi ...................... F02M 55/04
123/447

(Continued)

FOREIGN PATENT DOCUMENTS

| DE | 19807702 A1 | 8/1999 |
| DE | 102014205179 A1 | 9/2015 |
| JP | H07189871 A | 7/1995 |

OTHER PUBLICATIONS

International Search Report for PCT/EP2019/077004 dated Dec. 17, 2019.

*Primary Examiner* — Hai H Huynh
(74) *Attorney, Agent, or Firm* — Norton Rose Fulbright US LLP; Gerard Messina

(57) ABSTRACT

A component, which can be in the form of a fuel line or fuel distributor, is used for a fuel injection system, which is used for injecting fuel or a mixture of fuel and water having a variable water content. The component has a main body on which is provided a high-pressure inlet and at least one high-pressure outlet, the fuel, respectively the mixture being passable from the high-pressure inlet through an inner space of the main body to the least one high-pressure outlet, and an insertion member being configured in the inner space. The insertion member is at least partially made of at least a material having a modulus of compression specified to at least substantially correspond to or be lower than that of the fuel, respectively the mixture and/or lower than 30 GPa.

13 Claims, 5 Drawing Sheets

(51) Int. Cl.
*F02M 25/022* (2006.01)
*F02M 43/04* (2006.01)
*F02M 61/16* (2006.01)

(52) U.S. Cl.
CPC ..... *F02M 61/166* (2013.01); *F02M 2200/856* (2013.01); *F02M 2200/9015* (2013.01)

(58) Field of Classification Search
CPC ...... F02M 43/04; F02M 43/00; F02M 61/166; F02M 61/16; F02M 2200/855; F02M 2200/9015; F02M 2200/315; Y02T 10/12
USPC .......................................................... 123/456
See application file for complete search history.

(56) References Cited

U.S. PATENT DOCUMENTS

| | | | |
|---|---|---|---|
| 6,513,500 B2* | 2/2003 | Braun | F02M 55/04 |
| | | | 123/456 |
| 6,871,637 B2* | 3/2005 | Tsuchiya | F02M 55/025 |
| | | | 123/456 |
| 6,901,914 B1* | 6/2005 | Becene | F02M 69/465 |
| | | | 123/456 |
| 7,520,268 B1 | 4/2009 | Sims, Jr. | |
| 9,518,544 B2* | 12/2016 | Bartell | F02M 55/025 |
| 9,964,084 B2* | 5/2018 | Wang | F02M 61/168 |
| 10,731,611 B2* | 8/2020 | Guzman Escalante | |
| | | | F02M 69/465 |
| 10,851,748 B2* | 12/2020 | Gerundt | F02M 63/0275 |
| 2003/0084879 A1 | 5/2003 | Treusch et al. | |
| 2004/0107943 A1 | 6/2004 | Alder et al. | |
| 2006/0081220 A1* | 4/2006 | Sims, Jr. | F02M 37/0041 |
| | | | 123/467 |

* cited by examiner

COMPONENT, IN PARTICULAR FUEL LINE OR FUEL DISTRIBUTOR, AND FUEL INJECTION SYSTEM

FIELD

The present invention relates to a component, in particular a fuel line or a fuel distributor, for a fuel injection system. The present invention also relates to a fuel injection system, which preferably serves as a fuel injection system for mixture-compressing internal combustion engines having externally supplied ignition. In particular, the present invention is directed to the field of fuel injection systems of motor vehicles where fuel is directly injected into combustion chambers of an internal combustion engine.

BACKGROUND INFORMATION

German Patent Application No. DE 10 2014 205 179 A1 describes a fuel distributor rail for an internal combustion engine. Here, it is possible to alternate between two operating modes that include or do not include the admixture of water. The conventional fuel distributor rail has an elongated housing having a cavity, a fuel inflow into the cavity and at least two fuel outflows out of the same for each fuel injector. In this case, an insertion member, which has a groove that interconnects the two fuel outflows, is configured in the cavity, and, in the area of the fuel outflow, has a groove which extends radially circumferentially about the member in the region of the fuel inflow. The insertion member having the two grooves serves as an insert to ensure a direct inflow of fuel from a pump to the injectors. This results in a short delay time until injection when the system alternates between operating modes that include or do not include the admixture of water. The insertion member may have an inner volume which is used for damping, but is not located in the direct fuel flow.

It is a disadvantage of the fuel distributor rail described in German Patent Application No. DE 10 2014 205 179 A1 that the insert reduces the volume that is fillable with fuel in the cavity of the housing, thereby reducing the attainable damping relative to the required size. Moreover, fuel having a considerable water content can also accumulate in the inner volume of the insertion member during operation. This can only be reduced again with difficulty. Unwanted segregation can then occur when the engine is shut off. There is also a risk of frost damage.

SUMMARY

A component according to an example embodiment of the present invention and the fuel injection system according to an example embodiment of the present invention may have the advantage of making possible an enhanced design and method of functioning. In particular, an improved injection having a short delay time and efficient damping properties may be realized in the context of a reliable mode of operation.

The measures described herein make possible advantageous refinements of the component and the fuel injection system disclosed herein.

The upper limit value of 30 GPa corresponds, for example, to a plastic having a very high glass-fiber content.

The fuel injection system provided is used for injecting a mixture, it being intended that the mixture composition be variable during operation. In particular, a direct water injection may be realized where water in an emulsion including at least one fuel, in particular gasoline, is injected into combustion chambers of an internal combustion engine. Here, the water may be fed to the fuel upstream of or in a high-pressure pump and delivered, together with the same, by the fuel distributor to high-pressure injection valves.

The composition of the mixture, in particular of an emulsion of gasoline and water, may be varied here in the desired manner during operation. Adding water may be necessary, respectively desired only in a certain performance characteristics range, for example. Water, respectively a greater water content may be desired at a high speed and/or high load, for example. When this performance characteristics range is exited, for example, in the case of an overrun fuel cutoff, it is then advantageous when the injected water content may be rapidly reduced and, in particular quickly approaches zero again. For this purpose, a short delay time is required between the addition of the water upstream of or in the high-pressure pump and injection thereof via the high-pressure injection valves. In principle, the volume of the flow-traversed component, in particular a fuel line or fuel distributor, basically prolongs this delay time. The delay time may be shortened by placing the insertion member in the inner space of the main body. The insertion member provided may ensure a sufficient compressibility here in spite of the reduced hydraulic volume. This results in a continued damping, in particular in a damping of pressure pulsations, in spite of the reduced hydraulic volume.

Introducing the insertion member advantageously makes it possible to reduce the hydraulic volume in the inner space of the main body of the component and, at the same time, ensure a sufficient compressibility. At the same time, dead spaces, in which a mixture having a high water content could remain, may be avoided once the operation has already taken place again with a low water content. Moreover, the insertion member provided may also be inserted into a forged main body, such as is advantageous in the case of forged rails. A main body of this kind may be sealed by a sealing plug and does not need to undergo any high-temperature process, such as soldering or welding, during production. The sealing plug then makes possible a pressure- and gas-tight sealing of the inner space.

Compressing describes a pressing together of a body on all sides, whereby the volume of the body is reduced, respectively the density thereof is increased. Modulus of compression K may be defined as follows:

$$K = -dp/(dV/V). \quad (1)$$

Here, modulus of compression K is a measure of infinitesimal pressure change dp which occurs when there is an infinitesimal volume change dV of a volume V. Here, a reduction in the volume is described by a negative volume change dV, which results in a positive pressure change dp. Thus, modulus of compression K has a positive value and the unit used is Pascal. Depending on the pressure, modulus of compression K of water is within the range of between 2 and 2.7 GPa, for example. Depending on the temperature and pressure, a typical fuel may have a modulus of compression of approximately 1 GPa, for example. Depending on the water content, a modulus of compression of a mixture of fuel and water within the range of approximately 1 to 2 Gpa is then obtained, for example.

The material of the insertion member is selected in such a way that the modulus of compression thereof at least substantially corresponds to or is lower than that of the mixture. An upper limit for the water content of the mixture may be specified, for example. With regard to the maximum operating pressure of the fuel used, an upper limit then results for the range within which lies the modulus of compression of the mixtures used in operation.

It turns out that the insertion member may be advantageously formed in accordance with an embodiment as disclosed herein.

Here, a modulus of compression K of approximately 1 GPa for example, may be achieved. Depending on the particular application, modulus of compression K may be increased by an advantageous refinement of the present invention. For example, a polytetrafluoroethylene-based plastic may be filled with glass fibers. The modulus of compression K may be increased from approximately 1 GPa to approximately 2 GPa by a glass fiber content of 25%, for example.

Temperature- and/or pressure-dependent properties may be obtained here as a function of the form of the insertion member. Thus, the modulus of compression of an elastic isotropic body is computed from E modulus E thereof and Poisson's ratio ν in accordance with:

$$K = E/(3-6\nu). \qquad (2)$$

Since E modulus E for thermoplastic plastics for higher temperatures decreases, while Poisson's ratio ν typically increases slightly, the modulus of compression may decrease (thus, the compressibility may rise). In some instances, modulus of compression K may also become lower than a modulus of compression of a typical fuel. Depending on the design, respectively the critical operating point, the hydraulic volume in the inner space of the main body may then be optionally reduced still further, a reduction in the volume of the inner space and thus smaller geometric dimensions of the main body being possible, in particular which has a beneficial effect on the required installation space. A preferred limitation of modulus of compression K may be specified in according with an example embodiment of the present invention. A higher modulus of compression K may be achieved by the content and selection of the aggregates. Preferably, however, modulus of compression K is not set to be substantially greater than that of water. Thus, in comparison to a typical steel-based material, out of which a conventional insertion member may be formed, a considerably lower modulus of compression results for the insertion member provided since the modulus of compression of steel is 160 Gpa, for example. Depending on the composition, glass components may have a modulus of compression from a range of from 35 to 55 Gpa, for example.

Besides the elastic properties of the insertion member, which may be optionally adapted by aggregates, in particular fillers, and the choice of the matrix material, plastics have the advantage of making possible a viscoelastic deformation. The viscoelastic deformation results not only in an elastic compressibility, but also in a time-dependent deformation behavior. This time-dependent deformation behavior may be utilized to achieve a suitable phase shift between the exciting load and the internal stress, which may make it possible to further enhance the damping with respect to occurring pressure pulsations.

As a representative of thermoplastic materials, polytetrafluoroethylene (PTFE) is distinguished by a high resistance to temperature and to chemicals. It has been found that polytetrafluoroethylene is especially suited for gasoline injection. Furthermore, it has been found that polytetrafluoroethylene has a sufficiently low water absorption, which, in particular is lower than that of polyamide.

Furthermore, it has been found that the mechanical stresses present in the system in response to local pressure differences may generally be readily tolerated, since they only minimally disturb the hydrostatic stress state, and, moreover, the function of the system is basically not jeopardized, even if small plastic deformations of the material occur locally.

Other plastics, such as perfluoroalkoxy polymers, whose properties are similar to those of PTFE, may also be used. Also suited, for example, are fluoroethylenepropylene, polyvinylidene fluoride, tetrafluoroethylene, hexafluoropropylene, vinylidene fluoride and polychlorotrifluoroethylene. If expedient, combinations of materials may also be used.

Another advantage of the thermoplastic material is the low density thereof. This is, in fact, greater than that of the displaced liquid volume, but, relative to the total mass of the fuel injection system determined by steel components, for example, only leads to a slight relative increase. As a result, vibrational properties are not significantly influenced in the assembled state.

In accordance with an advantageous embodiment of the insertion member in accordance with the present invention, starting from the main form of the insertion member, an adaptation to the geometry specified for the inner space of the main body is possible here since the insertion member may be configured to be deformable.

An example embodiment of the present invention provides for positioning the insertion member in the inner space of the main body. In particular, two bent sections of the main body may be provided here between which the insertion member is placed. This makes it possible for the insertion member to be reliably secured in the inner space over the lifetime of the fuel injection system, which may be used, in particular as a component in the form of a fuel line. Another option for fastening the insertion member is disclosed herein.

In the case of solid bodies, modulus of compression K plays a role when a hydrostatic stress state is at hand. This is particularly the case when the solid body is pressurized on all sides. Such a loading state exists, therefore, when the insertion member is placed in the inner space in such a way that it is loaded there on all sides by the prevailing pressure. In the case of solid bodies, the hydrostatic stress state may be described by a stress tensor where only the main diagonal is occupied by equal values, namely negative applied pressure −p.

In accordance with the classic plasticity theory, such a stress state never leads to lasting deformations and, therefore, is also not able to lead to failure, which is confirmed experimentally for metals, in particular. The effect for an insertion member may be analyzed in the course of a simulation through a finite element method, respectively a finite element analysis. Such a simulation may be directed to the at least essential disappearance of von Mises stress, thus, in accordance with the classic elasticity theory, the stress which is decisive for the plastic deformation of bodies and for damage associated therewith, in particular in response to cyclic loading.

It may be important, in particular that the insertion member be highly pressurized on all sides, in order that a hydrostatic stress state be present. Apart from local pressure fluctuations due to the dynamics, such a state approximately exists since the insertion member displaces, respectively reduces a hydraulic volume. This makes it possible to considerably reduce the demands placed on the material strength and thus to select a suitable material class for the insertion member with respect to the other relevant properties.

Thus, a further refinement in accordance with the present invention is advantageous since the existence of a hydrostatic stress state may be ensured through the use of one or a plurality of spacer elements. Here, the embodiment may have the advantage that the insertion member may also be circumferentially enclosed by a spacer element. The fuel flow may then be achieved by the through bore, respectively the groove-shaped recess. Thus, the spacer elements may also have an annular shape, in particular.

BRIEF DESCRIPTION OF THE DRAWINGS

Preferred exemplary embodiments of the present invention are described in greater detail herein with reference to the figures in which corresponding elements are provided with identical reference numerals.

DETAILED DESCRIPTION OF EXAMPLE EMBODIMENTS

Figure 1A:
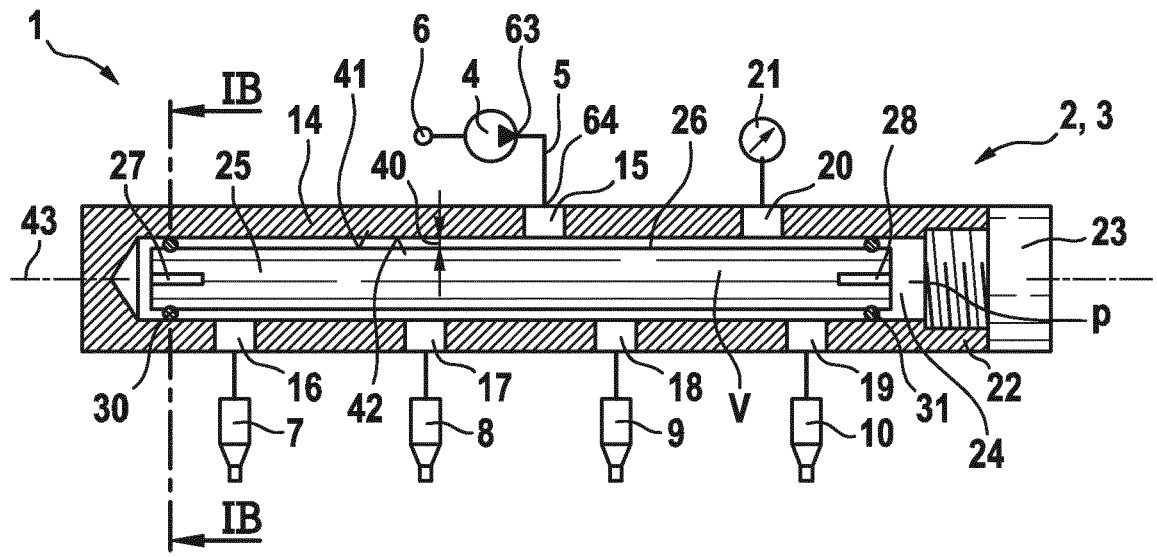
FIG. 1A schematically shows a fuel-injection system having a component in the form of a fuel distributor in accordance with a first exemplary embodiment of the present invention.

FIG. 1 schematically shows a fuel-injection system 1 having a fuel distributor 2 in accordance with a first exemplary embodiment. In this exemplary embodiment, fuel distributor 2 of fuel injection system 1 is a component designed in accordance with the present invention. Also provided is a high-pressure pump 4. High-pressure pump 4 communicates via a fuel line with fuel distributor 2. A mixture of fuel and water is fed to an inlet 6 of high-pressure pump 4. The water content is variable and may, in particular also be reduced to zero.

Fuel distributor 2 is used for storing and distributing fuel to fuel injectors 7 through 10 and thereby reduces the pressure fluctuations, respectively pulsations. Fuel distributor 2 may also serve to damp pressure pulsations which may occur upon switching of fuel injectors 7 through 10. Fuel distributor 2 is designed in such a way that, when the water content is varied, a short delay time is achieved with respect to the addition of the mixture at inlet 6 of high-pressure pump 4 until the mixture having the varied water content is injected via fuel injectors 7 through 10.

Fuel distributor 2 has a main tubular body 14, which may be produced by forging, for example. Main tubular body 14 has a high-pressure inlet 15 and a plurality of high-pressure outlets 16 through 19. Also provided on main tubular body 14 is a high-pressure connection 20. Fuel line 5 communicates with high-pressure inlet 15. Fuel injectors 7 through 10 are each connected to high-pressure outlets 16 through 19. Also provided is a pressure sensor 21, which is mounted on high-pressure connection 20. At one end 22, main tubular body 14 is sealed by a screw plug 23 in the form of a plug 23.

An inner space 24 is configured in main tubular body 14. Via inner space 24, the mixture fed to high-pressure inlet 15 may be distributed to fuel injectors 7 through 10 which are connected to high-pressure outlets 16 through 19. An insertion member 25, which reduces the hydraulic volume of inner space 24, is placed therein. This reduces a delay time between a variation in the water content of the mixture at inlet 6 and the metering by fuel injectors 7 through 10.

Insertion member 25 is made of a material having a modulus of compression K specified to at least substantially correspond to or be lower than that of the mixture fed through inner space 24. Insertion member 25 is preferably made of a thermoplastic plastic, in particular polytetrafluoroethylene. It is also possible that aggregates, in particular fillers, such as glass fibers, be provided in order to increase modulus of compression K of insertion member 25, when this is practical in the particular application. Modulus of compression K of the material, out of which insertion member 25 is made, may be 2 Gpa, for example. Modulus of compression K of the material is preferably no higher than 3 GPa.

Figure 1B:
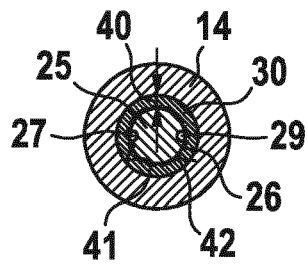
FIG. 1B is a sectional view through the component of the fuel injection system illustrated in FIG. 1A along the line of intersection denoted by IB.

In this exemplary embodiment, insertion member 25 is based on a main cylindrical form 26. Here, a plurality of recesses 27, 28, 29 (FIG. 1B), of which recesses 27 through 29 are shown exemplarily in FIGS. 1A and 1B, are formed on main cylindrical form 26. In this exemplary embodiment, recesses 27 through 29 are in a groove shape.

Insertion member 25 is positioned in inner space 24 via spacer elements 30, 31. A distance 40 is hereby ensured between an outer side 41 of insertion member 25 and an inner wall 42 of main tubular body 14. This ensures that pressure p of the mixture, which is passed through inner space 24, is applied to insertion member 25 from all sides. Pressure changes dp then lead to volume changes dV of volume V of insertion member 25, which are interrelated by predefined modulus of compression K in accordance with formula (1). Since, in comparison to steel, for example, modulus of compression K is very low, insertion member 25 may contribute significantly to damping. In particular, the material of insertion member 25 may be selected in such a way that modulus of compression K is not higher than that of the mixture passed through inner space 24. In this case, insertion member 25 only causes a reduction in the hydraulic volume, shortening the delay time, but not a lessening of the damping properties with respect to unfilled inner space 24, thus the entire volume of inner space 24.

Spacer elements 30, 31 may, in particular be designed as annular spacer elements 30, 31. Here, spacer elements 30, 31 prevent insertion member 25 from moving within inner space 24. Moreover, because of ensured distance 40, they make it possible to compensate for differences in thermal expansion.

FIG. 1B is a sectional view through fuel distributor 2 of fuel injection system 1 illustrated in FIG. 1A along the line of intersection denoted by IB. In the area of spacer element 30, groove-shaped recesses 27, 29 are formed on main cylindrical form 26 of insertion member 25. This permits a through-flow of the mixture along a longitudinal axis 43 (FIG. 1A) of main tubular body 14.

Figure 2:
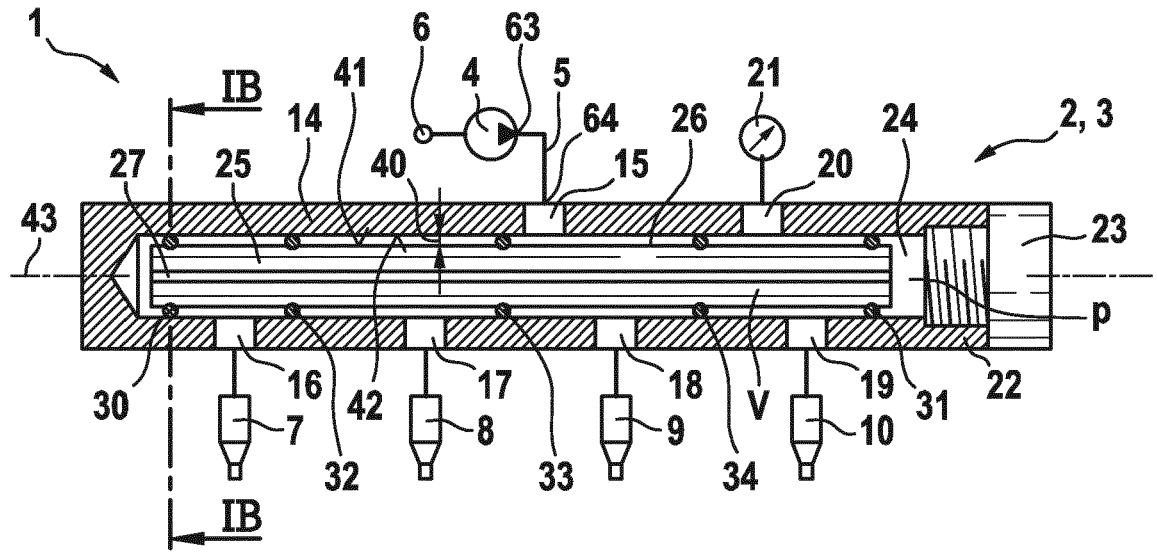
FIG. 2 shows a component in the form of a fuel distributor for the fuel injection system shown in FIG. 1 in a schematic sectional representation in accordance with a second exemplary embodiment of the present invention.

FIG. 2 shows fuel distributor 2 of fuel injection system 1 shown in FIG. 1 in a schematic sectional representation in accordance with a second exemplary embodiment. In this exemplary embodiment, a recess 27, which extends along longitudinal axis 43 over the entire length of main cylindrical form 26, is formed on main cylindrical form 26 of insertion member 25. The sectional view shown in FIG. 2 along IB follows in an unchanged representation from FIG. 1B, even if the specific embodiment is modified. Thus, symmetrically opposite recess 27 relative to longitudinal axis 43 is another recess 29. This embodiment is especially suited when a greater number of annular spacer elements 30 through 34 is provided, as illustrated in FIG. 2. Spacer elements 30, 34 may then be embodied as O-rings, in particular.

The number of recesses 27 through 29 illustrated in FIGS. 1A, 1B and 2 may vary relative to the particular application. Thus, spacer elements 30 through 34 ensure a reliable positioning of insertion member 25 within inner space 24. On the one hand, distance 40 then makes possible a reliable through-flow of the remaining hydraulic volume with [(sic.)] of the mixture in inner space 24. On the other hand, even in the case of temperature-induced changes in length, for example, which may differ for insertion member 25 and main tubular body 14, it is ensured that a certain distance 40 is maintained and, in particular that a resting of contact [(sic.) insertion] member 25 flat against inner wall 42 of main tubular body 14 is prevented.

When spacer elements 30 through 34 are provided, the number, embodiment, and configuration thereof may result in corresponding distances that yield high natural frequencies.

Figure 3A:
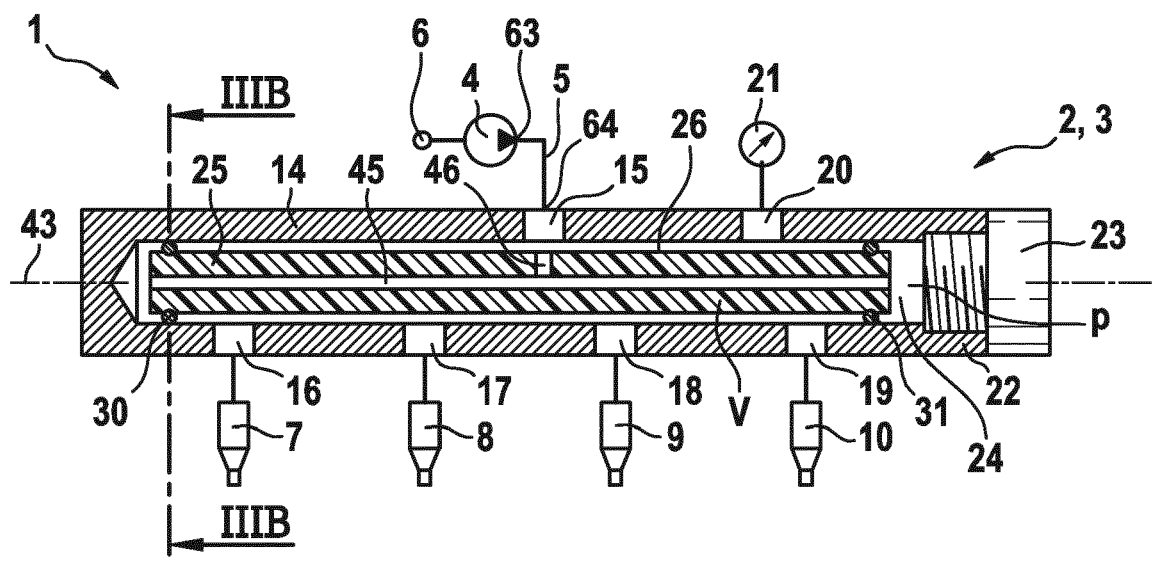
FIG. 3A shows a component in the form of a fuel distributor for the fuel injection system shown in FIG. 1 in a schematic sectional view in accordance with a third exemplary embodiment of the present invention.

FIG. 3A shows a fuel distributor 2 for fuel injection system 1 shown in FIG. 1 in a schematic sectional view in accordance with a third exemplary embodiment. In this exemplary embodiment, insertion member 25 has a through bore 45, which, in this exemplary embodiment, extends axially through main cylindrical form 26. In addition, insertion member 25 has at least one transverse bore 46. Transverse bore 46 connects through bore 45 to the hydraulic volume of inner space 24. This makes it possible for hydrostatic pressure p to be applied everywhere to insertion member 25, and for spacer elements 30, 31, which may be in the form of O-rings 30, 31, not to assume an inadvertent sealing function which could have a negative effect on pressure fluctuations. In a modified embodiment, a plurality of through bores 45 may also be provided. Another advantage of at least one through bore 45 as well as optionally of at least one transverse bore 46 is that a heat dissipation is made possible for cooling the material of insertion member 25. As a result, in the particular application, the heating of the material of insertion member 25 that occurs during operation in response to viscoelastic deformation as a result of pressure fluctuations may be dissipated more effectively. Especially in this case, transverse bore 46 may be associated with high-pressure inlet 15 to intensify the flow through insertion member 25.

Figure 3B:
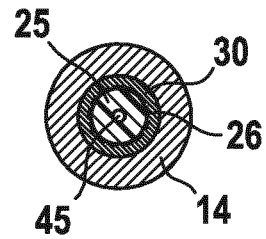
FIG. 3B is a sectional view through the component of the fuel injection system illustrated in FIG. 3A along the line of intersection denoted by IIIB.

FIG. 3B is a sectional view through fuel distributor 2 illustrated in FIG. 3A along the line of intersection denoted by 3B. In contrast to the embodiment illustrated with reference to FIG. 1B, no recesses 27 through 29 in main cylindrical form 26 are required, eliminating the need therefor.

Figure 4:
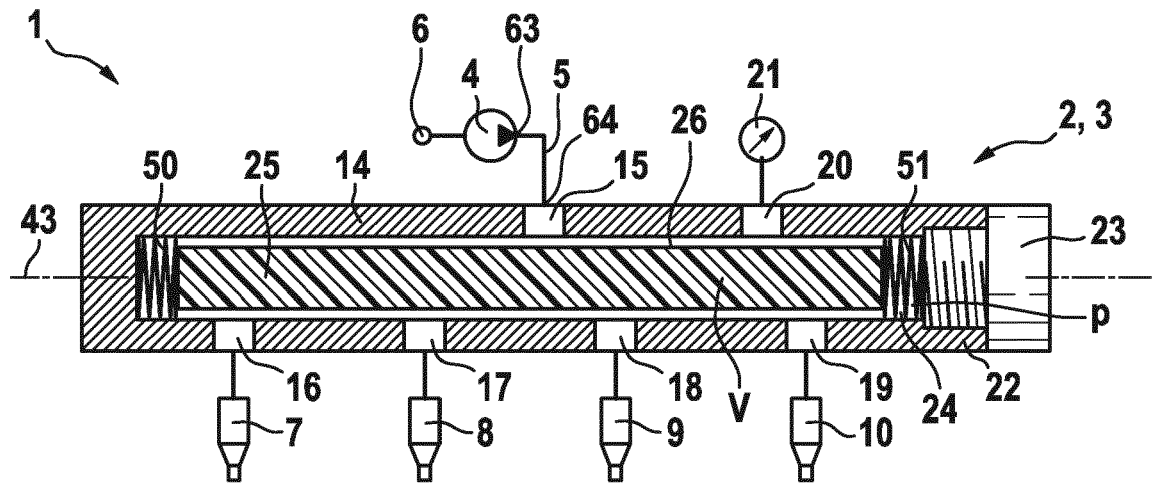
FIG. 4 shows a component in the form of a fuel distributor for the fuel injection system shown in FIG. 1 in a schematic sectional representation in accordance with a fourth exemplary embodiment of the present invention.

In a schematic sectional view in accordance with a fourth exemplary embodiment, FIG. 4 shows a fuel distributor 2 for fuel injection system 1 shown in FIG. 1.

In this exemplary embodiment, spacer elements 50, 51 for positioning insertion member 25 in inner space 24 of main tubular body 14 are provided at the axial ends of insertion member 25. Here, spacer elements 50, 51 may be formed to be elastically deformable. In this exemplary embodiment, spacer elements 50, 51 are formed as spring elements 50, 51 to compensate for differences in the thermal expansion and relative movements between insertion member 25 and main tubular body 14. Here, relative mechanical movements may also be compensated.

Figure 5:
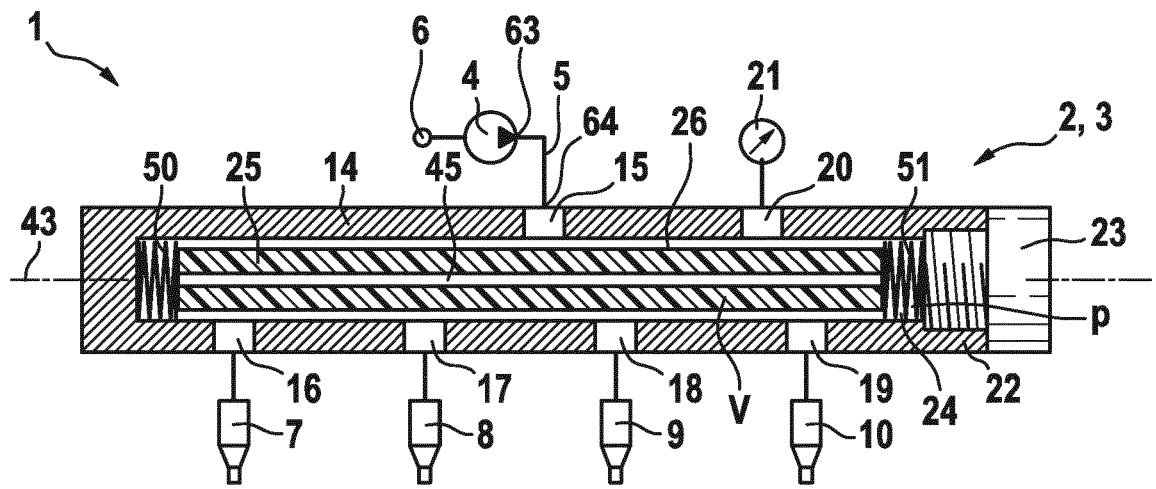
FIG. 5 shows a component in the form of a fuel distributor for the fuel injection system shown in FIG. 1 in a schematic sectional representation in accordance with a fifth exemplary embodiment of the present invention.

FIG. 5 shows a fuel distributor 2 for fuel injection system 1 shown in FIG. 1 in a schematic sectional view in accordance with a fifth exemplary embodiment. In contrast to the exemplary embodiment described with reference to FIG. 4, insertion member 25 has an axial through bore 45. A flow through through bore 45 is made possible by a suitable embodiment of spring elements 50, 51, for example, in the form of coil springs 50, 51. Here, a transverse bore 46 (FIG. 3A) may also be provided.

Figure 6:
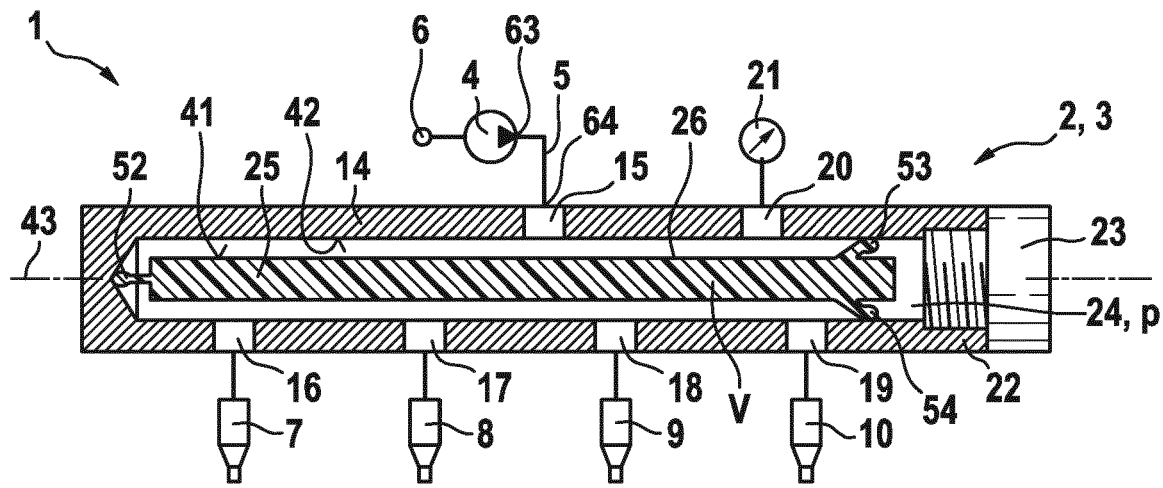
FIG. 6 shows a component in the form of a fuel distributor for the fuel injection system shown in FIG. 1 in a schematic sectional representation in accordance with a sixth exemplary embodiment of the present invention.

FIG. 6 shows a fuel distributor 2 for fuel injection system 1 shown in FIG. 1 in a schematic sectional view in accordance with a sixth exemplary embodiment. In this exemplary embodiment, spacer elements 52, 53, 54 are integrally formed on main cylindrical form 26. Spacer elements 52 through 54 may be extruded onto main cylindrical form 26, for example. In this exemplary embodiment, spacer elements 52 through 54 are small arm-shaped. In a preferred embodiment of insertion member 25 of a suitable plastic, spacer elements 52 through 54 may also be optionally directly co-extruded on during forming. Depending on the forming and flexibility, these extruded-on spacer elements 52 through 54 make it possible to compensate for temperature-induced movements and relative movements. Here, a suitable number of such spacer elements 52 through 54 is provided in order to make possible the required, respectively desired number of bearing points on inner wall 42 of main tubular body 14.

Figure 7:
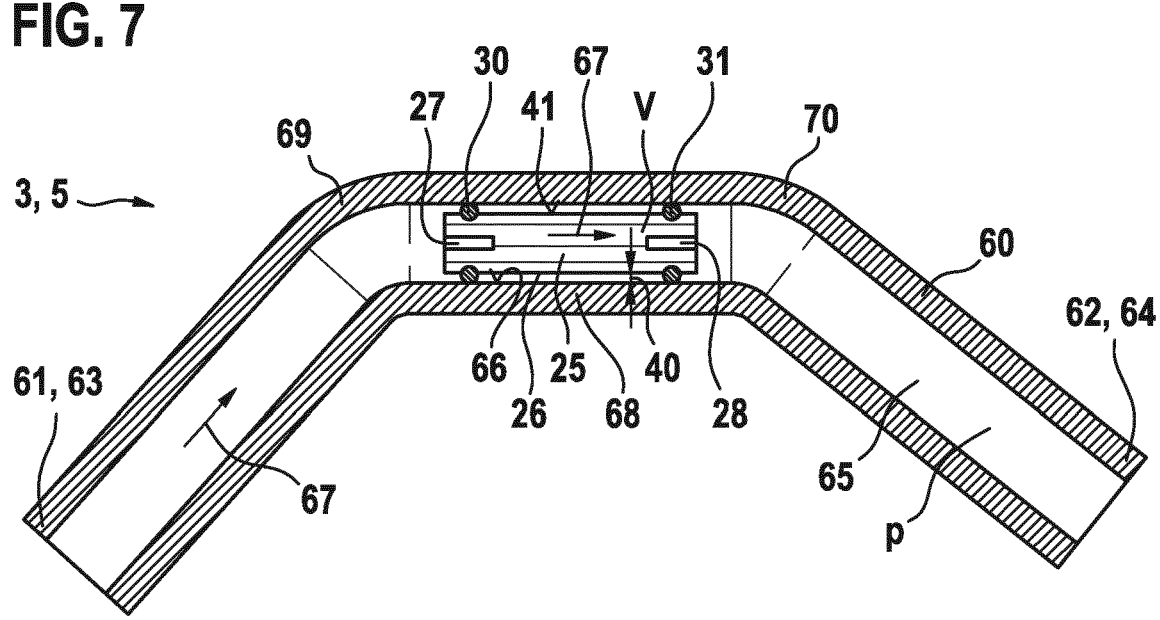
FIG. 7 shows a component in the form of a fuel line in a schematic sectional representation in accordance with a seventh exemplary embodiment of the present invention.

In accordance with a seventh exemplary embodiment, FIG. 7 shows a component 3 in the form of a fuel line 5 for fuel-injection system 1 illustrated in FIG. 1. Fuel line 5 has a main tubular body 60. A high-pressure inlet 63 and a high-pressure outlet 64 are realized at ends 61, 62 of main tubular body 60. Depending on the embodiment, it is also possible for high-pressure inlet 63 and high-pressure outlet 64 to be interchanged. However, in the assembled state of fuel injection system 1, high-pressure inlet 63 is located on high-pressure pump 4, and high-pressure outlet 64 permits communication with fuel distributor 2, as shown schematically in FIG. 1A.

At this stage, component 3 in the form of a fuel line 5 is designed correspondingly. Insertion member 25 is configured in an inner space 65. Spacer elements 30, 31 ensure a distance 40 between outer side 41 of main cylindrical form 26 of insertion member 25 and an inner wall 66 of main tubular body 60.

Recesses 27, 28 ensure the through-flow of the mixture in a through-flow direction 67 through inner space 65. Here, further recesses may be provided correspondingly.

During manufacture of fuel line 5, insertion member 25 may initially be inserted into a middle section 68 of main tubular body 60. Main tubular body 60 may then be suitably bent, in this exemplary embodiment, two bent sections 69, 70 being provided, between which insertion member 25 is positioned. Prior to the bending of main tubular body 60, for example, insertion member 25 may be introduced by a caliper into middle section 68, which remains straight following the bending.

Figure 8:
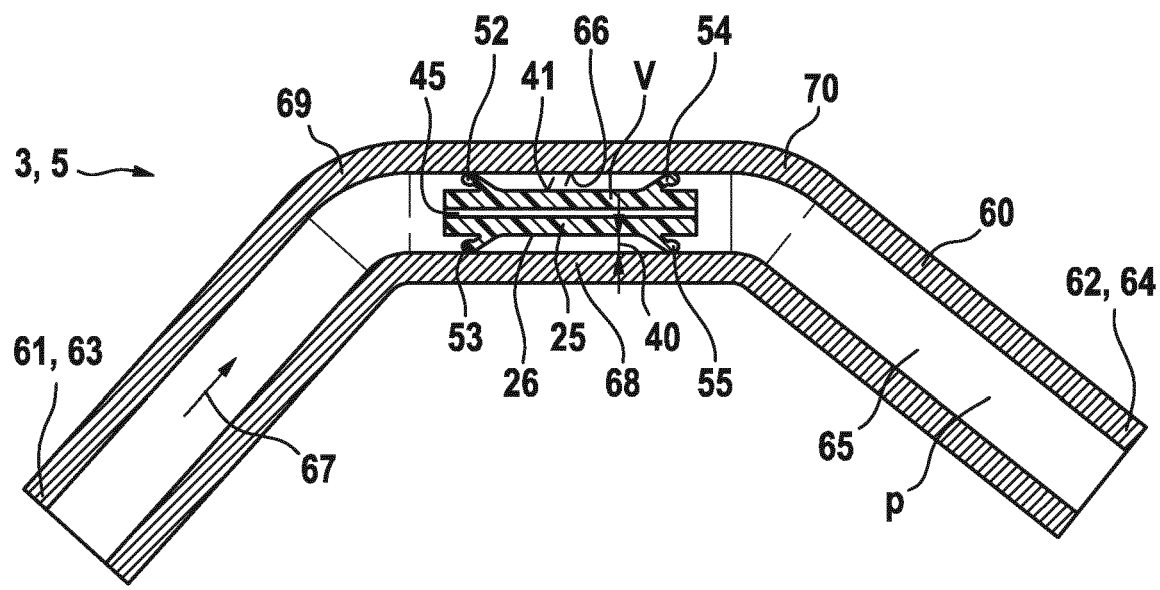
FIG. 8 shows a component in the form of a fuel line in a schematic sectional representation in accordance with an eighth exemplary embodiment of the present invention.

FIG. 8 shows a fuel line 5 in a schematic sectional view in accordance with an eighth exemplary embodiment. In this exemplary embodiment, insertion member 25 has a through bore 45 in the form of a cylindrical bore. This likewise results in a hydrostatic state. A damping or restriction effect may also be achieved by the dimensioning of through bore 45, through which the mixture flows in through-flow direction 67 during operation. Depending on the embodiment of spacer elements 52, 53, 54, 55, mixture is also able to flow through the space between outer side 41 of insertion member 25 and inner wall 42 of main tubular body 60. Spacer elements 52 through 55 may be small arm-shaped, for example, as in the exemplary embodiment described with reference to FIG. 6. Thus, a targeted damping or restriction effect may be achieved by specifying distance 40 and/or dimensioning through bore 45.

Figure 9A:
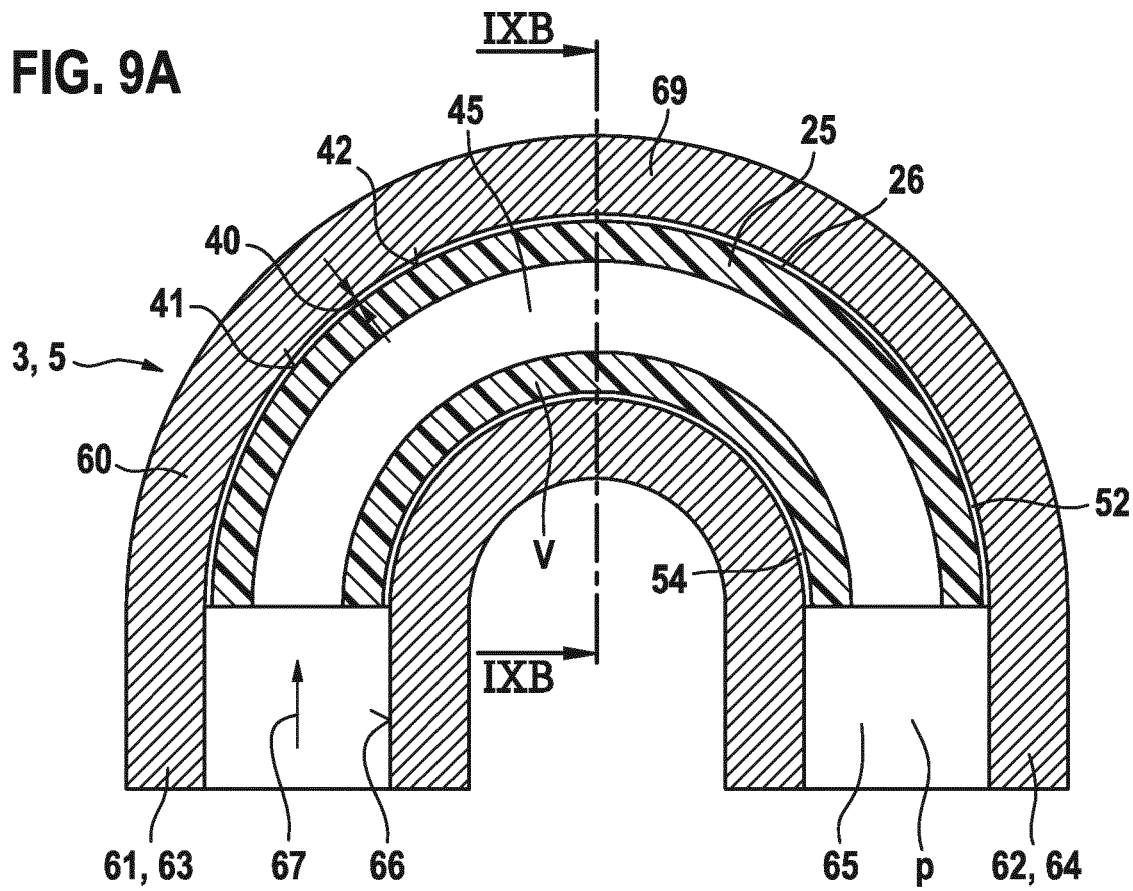
FIG. 9A shows a component in the form of a fuel line in a schematic sectional representation in accordance with a ninth exemplary embodiment of the present invention.
Figure 9B:
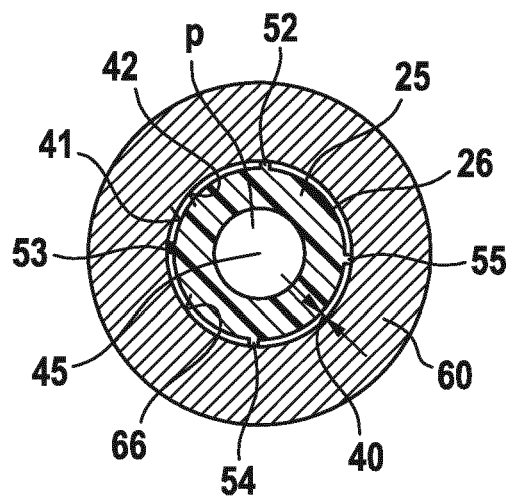
FIG. 9B is a sectional view through the component illustrated in FIG. 9A along the line of intersection denoted by IXB.

In accordance with a ninth exemplary embodiment, FIG. 9A shows a fuel line 5 in a schematic sectional view. Furthermore, FIG. 9B is a sectional view through fuel line 5 illustrated in FIG. 9A along the line of intersection denoted by IXB. In this exemplary embodiment, insertion member 25 is made of a readily formable material. In particular, a readily formable plastic may be used as the material. Insertion member 25 is configured in bent section 69 of main tubular body 60. Here, during manufacture, insertion member body 25 may be inserted into an initially straight main tubular body 60 and subsequently bent together therewith. Bent section 69 then fixes insertion member 25 in position. To ensure a distance 40 between outer side 41 of insertion member 25 and inner wall 42 of main tubular body 60, spacer elements 52 through 55 in the form of spacer ribs, respectively longitudinal elevations are provided in this exemplary embodiment. Here, spacer elements 52 through 55 are preferably configured over the entire length of insertion member 25 on outer side 41 of insertion member 25. This ensures that hydrostatic pressure p acts essentially on entire outer side 41 of insertion member 25. A hydrostatic loading state may thereby be ensured in this exemplary embodiment as well. Here, spacer elements 52 through 55 prevent insertion member 25 from resting flat against inner wall 42 of main tubular body 60.

Besides the described exemplary embodiments, other inner spaces of a fuel injection system 1 may also be partially reduced correspondingly with respect to the hydraulic volume thereof. In contrast to conventional systems, the reduced hydraulic volume combined with simultaneously high compressibility and damping due to viscoelastic effects permits a more rapid pressure build-up. In particular, when modulus of compression K is lower and the inner damping of insertion member 25 is greater than that of the mixture, a reduction of the installation spaces is then also made possible. In addition, pressure pulsations and thus hydraulic excitations may be lessened, making possible shortened response times, particularly in the case of fuel injection systems 1 for direct water injection. Generally, therefore, an advantageous application of fuel injection systems 1 for injecting fuel is possible, which relates, in particular to direct fuel injection applications.

The present invention is not limited to the exemplary embodiments described herein.

What is claimed is:

1. A component for a fuel injection system which is used for injecting fuel or a mixture of fuel and water having a variable water content, comprising:
   a main body on which are provided a high-pressure inlet and at least one high-pressure outlet, the fuel or the mixture being passable from the high-pressure inlet through an inner space of main body to the least one high-pressure outlet; and
   an insertion member configured in the inner space, wherein the insertion member is made of at least a material having a modulus of compression specified to at least substantially correspond to or be: (i) lower than that of the fuel or the fuel mixture, and/or (ii) lower than 30 GPa,
   wherein at least a spacer element is provided which prevents a resting of the insertion member flat against an inner wall of the main tubular body.

2. The component as recited in claim 1, wherein the component is a fuel line or fuel distributor.

3. The component as recited in claim 1, wherein the insertion member is at least partially made of a thermoplastic plastic.

4. The component as recited in claim 3, wherein the plastic is provided with aggregates.

5. The component as recited in claim 4, wherein a content of the aggregates are specified in such a way that the modulus of compression of the material is not higher than approximately 2 GPa.

6. The component as recited in claim 1, wherein the insertion member is made at least partially of a polytetrafluorethylene, at least of a perfluoroalkoxy polymer, fluoroethylenepropylene, polyvinylidene fluoride, tetrafluoroethylene, hexafluoropropylene, vinylidene fluoride or polychlorotrifluoroethylene-based plastic.

7. The component as recited in claim 1, wherein the modulus of compression of the material is not higher than approximately 3 Gpa.

8. The component as recited in claim 1, wherein the insertion member is based on an at least approximately main cylindrical form.

9. The component as recited in claim 1, wherein the main body has at least a bent section, and the bent section limiting a displacement of the insertion member within the inner space.

10. The component as recited in claim 1, wherein the main body has at least a bent section, and the insertion member being at least partially configured and bent in the bent section.

11. The component as recited in claim 1, wherein the insertion member has at least one through bore, and/or, on an outer side of the insertion member, the insertion member has at least one groove-shaped recess.

12. The component as recited in claim 1, wherein the spacer element is an O-ring shaped spacer element.

13. A fuel injection system used for injecting fuel or a mixture of fuel and water having a variable water content, using a component comprising:

a main body on which are provided a high-pressure inlet and at least one high-pressure outlet, the fuel or the mixture being passable from the high-pressure inlet through an inner space of main body to the least one high-pressure outlet; and an insertion member configured in the inner space, wherein the insertion member is made of at least a material having a modulus of compression specified to at least substantially correspond to or be: (i) lower than that of the fuel or the fuel mixture, and/or (ii) lower than 30 GPa, wherein at least a spacer element is provided which prevents a resting of the insertion member flat against an inner wall of the main tubular body.

* * * * *